July 6, 1926.
M. G. McNEELY
BALL BEARING
Filed Nov. 12, 1923
1,591,395
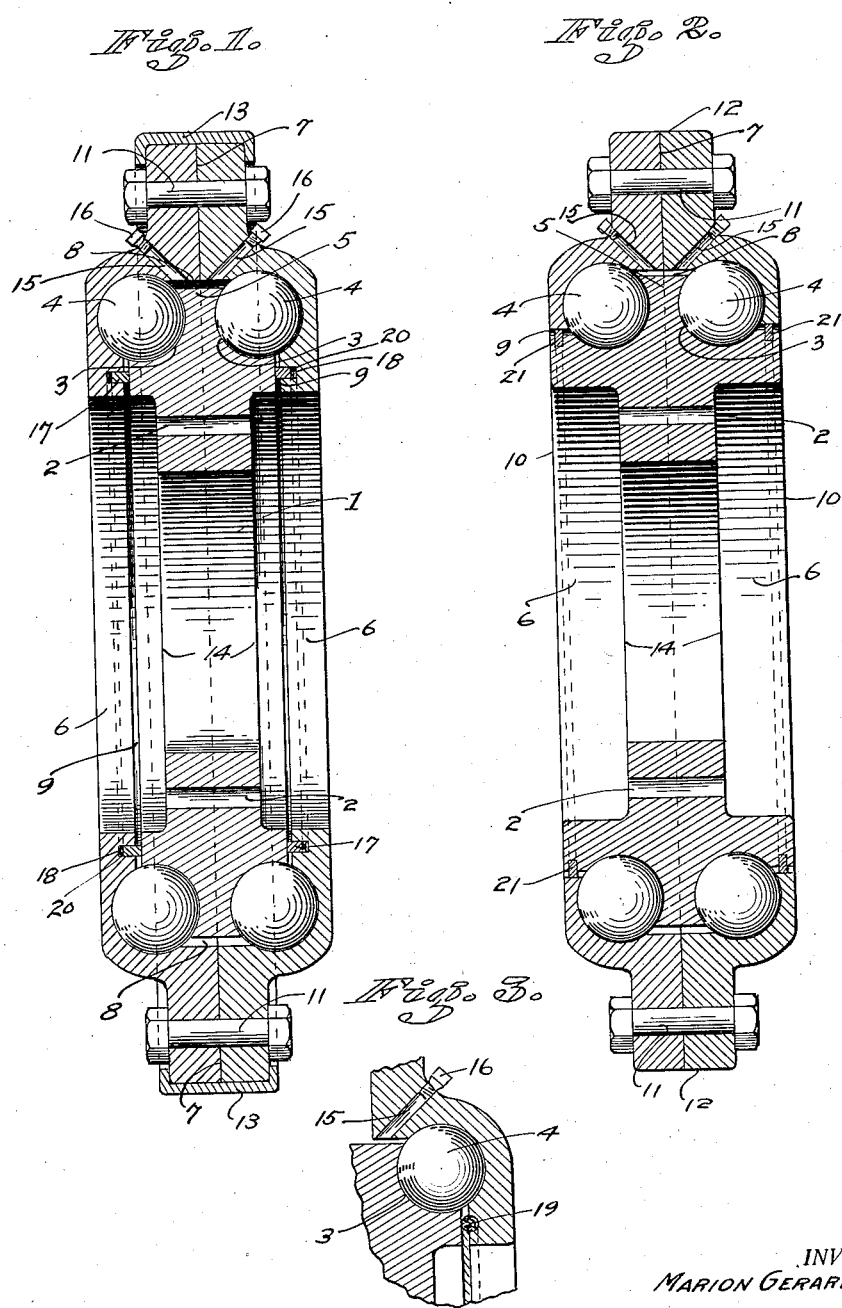
INVENTOR.
MARION GERARD McNEELY
BY
ATTORNEYS.

Patented July 6, 1926.

1,591,395

UNITED STATES PATENT OFFICE.

MARION GERARD McNEELY, OF OAKLAND, CALIFORNIA.

BALL BEARING.

Application filed November 12, 1923. Serial No. 674,323.

This invention relates to ball bearings as used in automobiles and other classes of machinery, and particularly to the type of bearing adapted to sustain a thrust as well as a radial load.

The principal objects of my invention are, a bearing of this type which will be one hundred per cent effective either as a radial or as a thrust bearing whether the thrust be in either direction, and which will be easy to manufacture, assemble or disassemble, easy to lubricate and which will retain its lubricant.

I achieve these objects in the construction shown in the drawings and in which Figure 1 is a central cross section of my bearing showing all of its parts; Figure 2 is a similar section of my bearing with a different arrangement of the resilient packing ring; and Figure 3 is a fragmentary section of an optional packing ring for use with the bearing as illustrated in Figure 1. Since all the elements of my bearing are round, the cross sections shown in the drawing should be sufficiently illustrative of the invention which is revealed only in a cross section.

In the figures, (1) is an inner ring or collar adapted to be placed on a shaft or bolted to any revolving part through the holes (2). The collar has formed around its outer edge two parallel ball races (3), each containing the usual steel balls (4) and which may be used either with or without separators, as may be desired.

The ball races in the collar are formed approximately to the curve of the balls as shown, and a tongue (5) projects outward between the balls to a point above their centers and also follows the curve of the balls.

Surrounding the outer sides of the balls is a double ball race member (6) split into two symmetrical halves in the center as shown at (7). The double races in the outer member also follow the curve of the balls to within a small distance (8) of the tongue (5) and also to within a similar distance (9) of the sides of the inner race member (1).

In the drawings it should be observed that the width of the inner race member is less than the total distance across the balls and that the outer race sides curve inwardly below the center of the balls as they approach the inner race member.

In Figure 2 the embracing of the balls by the races is the same as in Figure 1 except that the clearance space (9) is arranged at right angles to the sides (10) of the bearing instead of parallel therewith.

The halves of the outer split race are secured together by bolts or screws (11) in an outer flange (12), or may have a locking strip (13) crimped over the flange as indicated in Figure 1.

As shown in the figures the bearing has an outer flange (12) and an inner flange (14) but it is apparent that these may be modified or dispensed with to meet certain requirements of the structure with which the bearing is to be used.

At both sides of the outer flange are oil holes (15) directed at an angle as shown to avoid the load surface of the race, and opening just over the tongue (5). Suitable plugs may be used to close the oil holes as indicated at (16).

To prevent oil from leaking through the inner clearance (9) I provide packing rings (17) in grooves (18) adapted to press lightly against the inner race member. This packing may be a strand of fibrous material as indicated in Figure 3 at (19) but I prefer to use metal or composition rings pressed against the inner race by a thin flat undulating spring (20).

In the design shown in Figure 2 the packing ring (21) takes the form of a split piston type ring springing outwardly against the edge of the outer race member (6) and requires no auxiliary spring to force it in contact.

Due to the fact that my outer race member passes inwardly beyond the center of the balls and is curved to embrace them beyond said center, and that the tongue or radial flange (5) of the inner race is similarly formed in an oppositely projecting direction, it will be seen that my bearing will sustain a load either radially or axially applied in either direction to the limit as determined by the unit stress, and provides what I term a hundred per cent radial and double thrust bearing, and as far as I am aware quite different from the usual combination bearings wherein either the radial or the thrust function is subservient.

I claim:

1. A combined radial and thrust ball bearing comprising inner and outer double ball race members having a double row of balls therein, the inner and outer races projecting radially, respectively, one between the rows of balls and the other outside the rows of balls to a point beyond the center of the balls and terminating with a small clearance space between the race members, and packing means in one of the race members bearing against the other race member to close the clearance space.

2. A combined radial and thrust ball bearing comprising inner and outer double ball race members having a double row of balls therein, the inner and outer races projecting radially, respectively, one between the rows of balls and the other outside the rows of balls to a point beyond the center of the balls and terminating with a small clearance space between the race members, a groove in one of the members and a ring in the groove adapted to bear against the other member to close the clearance space.

3. A combined radial and thrust ball bearing comprising inner and outer double ball race members having a double row of balls therebetween, the inner member projecting between the balls outwardly beyond the center of the balls, and the outer member projecting inwardly beyond the center of the balls at the outer sides of both races, an outwardly projecting flange on the outer member and an inwardly projecting flange on the inner member, each flange having plurality of securing holes therein.

MARION GERARD McNEELY